UNITED STATES PATENT OFFICE.

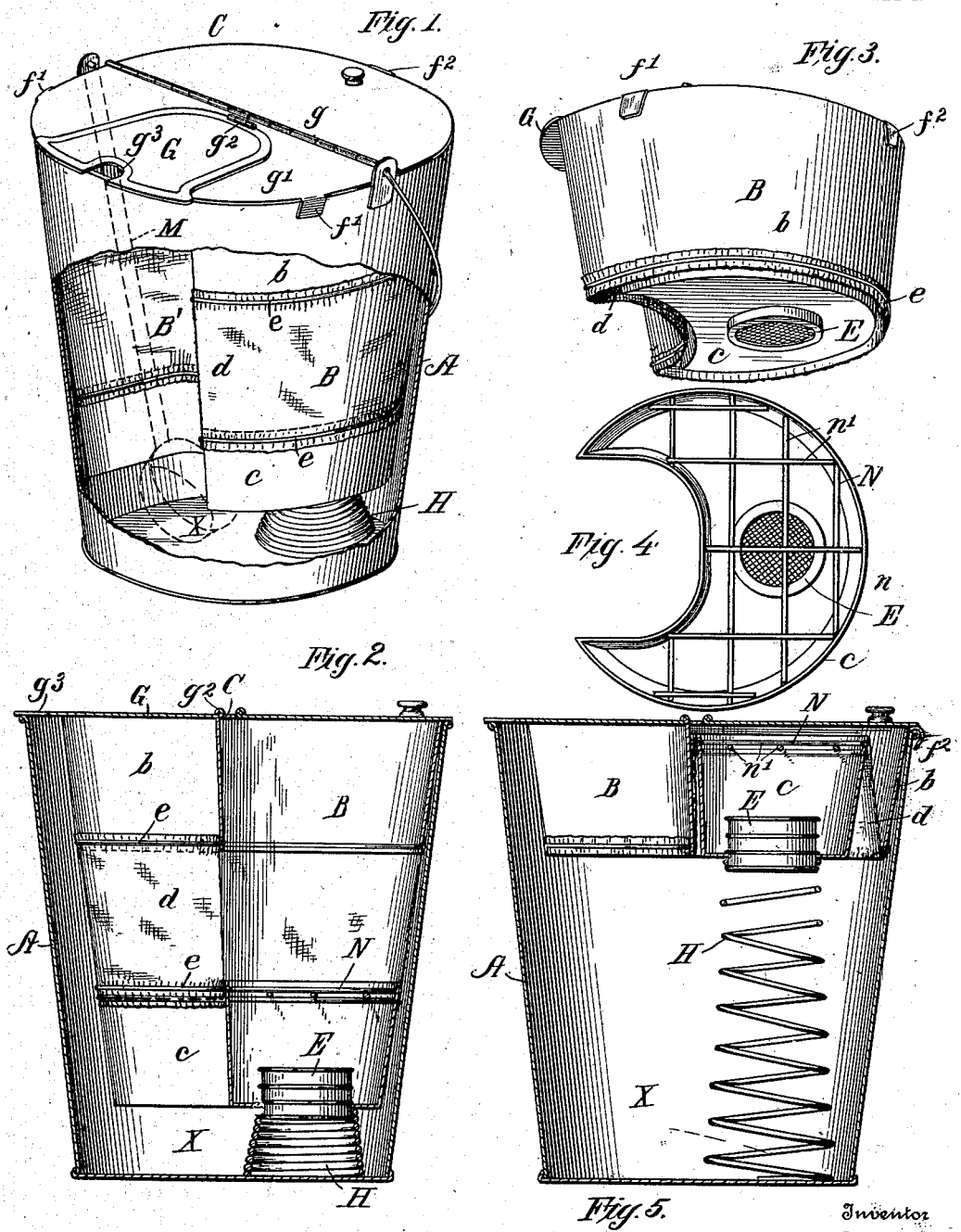

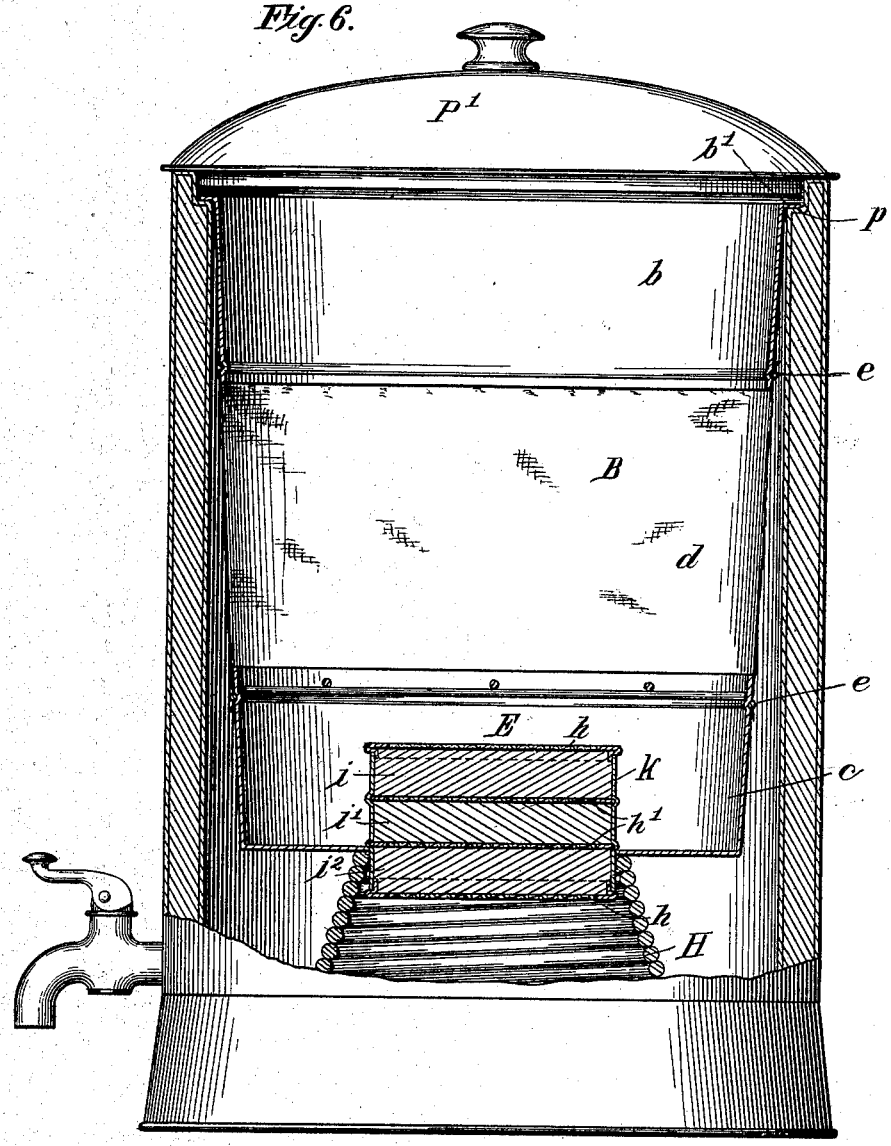

JOHN W. BURNS, OF TERRE HAUTE, INDIANA.

WATER-FILTER.

SPECIFICATION forming part of Letters Patent No. 723,238, dated March 24, 1903.

Application filed December 18, 1902. Serial No. 135,682. (No model.)

*To all whom it may concern:*

Be it known that I, JOHN W. BURNS, a citizen of the United States, residing at Terre Haute, in the county of Vigo and State of Indiana, have invented certain new and useful Improvements in Water-Filters, of which the following is a specification.

The object of my invention is to provide improved means for filtering water which may be readily applied to an ordinary water-cooler or to a bucket or other vessel.

An important feature of my invention resides in providing means whereby the receptacle for containing the muddy or unfiltered water may be automatically gradually diminished in capacity as the filtration progresses, while the capacity of the receptacle for receiving the filtered water may be correspondingly increased. To accomplish this result, I provide a collapsible receptacle in which the unfiltered water is first placed and which is provided in its lower portion with suitable filtering material. This receptacle for the unfiltered water is arranged within a water-cooler, bucket, or other vessel over a spring which tends to collapse it. The collapsible receptacle is distended when filled with water, but is automatically gradually collapsed as the water passes through the filter into the receiving vessel.

Further particulars as to the construction and operation of my improved filtering apparatus will be hereinafter more fully set forth.

In the accompanying drawings, Figure 1 is a perspective view of my improvements applied to an ordinary bucket or water-pail. Some parts are broken away in order to better illustrate other parts. Fig. 2 shows a vertical central section of the filter constructed in the manner illustrated in Fig. 1. Fig. 3 is a perspective view of the filtering vessel as it appears when collapsed. Fig. 4 is a top plan view showing a modification in which a shield or grating is employed to hold ice away from the filtering material. Fig. 5 shows a vertical central section similar to that shown in Fig. 2 with the filtering vessel collapsed. Fig. 6 shows my improvements as applied to an ordinary water-cooler. The view is mainly in longitudinal central section.

Referring first to Figs. 1 to 5, inclusive, A indicates a bucket or water-pail of ordinary form. Within the bucket is arranged a collapsible receptacle B, comprising an upper section $b$, a lower section $c$, and a central section $d$. The upper and lower sections $b$ and $c$ may be made of aluminium, tin, or other suitable metal, while the central section $d$ is made of canvas or other similar flexible material sufficiently thick and closely woven to prevent water from passing through it. The canvas is attached to the sections $b$ and $c$ in any suitable way, preferably by means of binding-wires $e$. The connection should be a strong one and should be such as to prevent water from leaking past the joints. The inner receptacle B is provided with a top or cover C. The rear portion $g'$ of the cover may be rigidly attached to the upper edge of the section $b$, and it is provided with lugs $f'$, which fit over the upper edge of the bucket. The front portion $g$ of the cover is hinged to the rear portion $g'$ and constitutes a lid, by means of which access may be obtained to the interior of the vessel B. A lug $f^2$ is formed on the upper edge of the section $b$ opposite the hinge of the lid G for supporting the inner vessel at that point. The rear portion $g'$ of the cover is provided with a lid G, hinged at $g^2$ and provided with an opening $g^3$ for a dipper-handle. The dipper may be withdrawn when the lid G is raised, and the receptacle B is formed with a large curved recess B' to accommodate the dipper, allowing it to be lowered to the bottom of the bucket and to be withdrawn from the top thereof when the lid G is open. The bottom of the receptacle B is closed and carries a filter-box E. This may be of any suitable construction so long as it contains suitable filtering material. Below the receptacle B is arranged a coiled spring H, which rests on the bottom of the bucket and bears against the bottom of the vessel B. When there is no water in the vessel B, the spring is distended, as indicated in Fig. 5, thus collapsing the filtering vessel, causing it to appear as indicated in Fig. 5. When the vessel B is full of water, the spring will be put under compression and the parts will appear as indicated in Fig. 2. Preferably the filtering-box E is constructed in the manner indicated in Fig. 6, consisting of upper and lower perforated plates $h$ $h$ and inner perforated plates $h'$ $h'$. Between the perforated plates are arranged layers or sections of filtering material $i\ i'\ i^2$. Any suitable filtering material may be employed. The main cylindrical frame $k$ may be made of metal and connected with the partitions in any suitable way. Preferably the filtering-box extends part way up into the filtering vessel B and a short distance below the bottom thereof, the upper end of the spring H being arranged to encircle the lower projecting end of the box. The upper section $b$ is stationary; but the lower section $c$ is movable vertically. When water is poured into the section $c$, the weight of the water will cause the section $c$ to lower gradually, putting the spring H under compression, the canvas $d$ lowering as the section $c$ lowers, and finally when the vessel B is full of water the sections $b$, $c$, and $d$ will all appear in the position shown in Fig. 2. The water filters slowly through the filtering-box E and passes into the space X at the bottom of the bucket, which gradually fills with filtered water. As the water leaves the vessel B the weight or pressure on the spring H is gradually reduced and the lower section $c$ of the vessel B is gradually raised until it is finally raised to the position shown in Fig. 5, when all or practically all the water in the filtering vessel B has passed into the bucket. At this time the bucket will therefore be full of filtered water, which may be withdrawn as fast as needed by means of the dipper M. It will thus be seen that I provide means for filtering a large quantity of water and also means for receiving a large quantity of filtered water and that the space occupied by the vessel which receives the unfiltered water is afterward occupied by the filtered water.

If it is desired to place ice in the water, it may be done; but preferably I provide a supporting-frame N for the ice, such as indicated in Fig. 4. This is preferably arranged at the top of the lower section $c$, as indicated in Fig. 2. It may consist of a frame $n$ of the general shape of the lower section $c$, which supports crossed wires $n'$. In Fig. 6 I have shown my improvements applied to a water-cooler of ordinary construction. The upper section $b$ of the inner vessel B is flanged at $b'$ and rests on a shoulder $p$ on the upper edge of the cooler. The top P' of the cooler may readily be lifted and replaced without interference with the inner receptacle B. The lower section $c$ of the vessel B is similar in general construction to the section $c$ shown in Fig. 1, except that in the present instance it may be made cylindrical, as it is not necessary to provide a recess to receive the dipper. The sections $b$ and $d$ are likewise made cylindrical. The filtering-box E is of the same construction as that before described and the spring H operates in the same way. The spring should be of such nature that it will raise the lower section of the vessel B correspondingly and proportionately with the decrease in weight caused by the passage of the filtered water into the outer receptacle.

It is obvious that my improvements may be applied to water-coolers of usual construction without material alteration in such construction, and they may be applied to buckets or other similar vessels without altering their construction.

I claim as my invention—

1. The combination of a vessel for receiving filtered water, a collapsible vessel within it for holding the unfiltered water, filtering material carried by the inner vessel placed between and affording communication between the two vessels, and a spring for collapsing the inner vessel.

2. The combination of a vessel for receiving filtered water, a sectional collapsible vessel within it for holding unfiltered water, filtering material carried by the inner vessel placed between and affording communication between the two vessels, and a spring for collapsing the inner vessel.

3. The combination of a vessel for receiving filtered water, a vessel within it for holding unfiltered water, comprising upper and lower sections connected by a flexible section, a filtering material carried by the inner vessel placed between and affording communication between the two vessels, and a spring interposed between the bottom of the lower section of the inner vessel and the bottom of the outer vessel for collapsing said inner vessel.

4. The combination of a vessel for receiving filtered water, a vessel within it for holding unfiltered water, comprising an upper metallic section, a lower metallic section, and a central section of canvas or similar flexible material, a box of filtering material carried by the inner vessel placed between and affording communication between the inner and outer vessels, and means for collapsing the inner vessel.

5. The combination of a vessel for receiving filtered water, a vessel within it for receiving unfiltered water, a box of filtered material carried by the inner vessel placed between and affording communication between the inner and outer vessels, a spring for raising the inner vessel, and a frame or grating above the box of filtering material for supporting ice.

6. The combination of an outer vessel for holding filtered water, an inner vessel for holding unfiltered water, having a recess B' to accommodate a dipper, and comprising upper and lower sections connected by a flexible section, filtering material carried by the lower section placed between and affording communication between the inner and outer vessels, and a spring for collapsing said inner vessel.

In testimony whereof I have hereunto subscribed my name.

JOHN W. BURNS.

Witnesses:
THOMAS J. ROACH,
JOHN F. O'BRIEN.